United States Patent [19]

Potter

[11] Patent Number: 4,759,569
[45] Date of Patent: Jul. 26, 1988

[54] JACKET WITH SAFETY HARNESS FOR USE WITH TRANSPORT VEHICLE

[76] Inventor: Cyril S. Potter, 82 Cleveland St., Orange, N.J. 07050

[21] Appl. No.: 29,189

[22] Filed: Mar. 23, 1987

[51] Int. Cl.⁴ .......................................... B60R 21/10
[52] U.S. Cl. .................................. 280/748; 297/465; 297/485
[58] Field of Search ................ 280/801, 748; 297/464, 297/465, 485; 128/134

[56] References Cited

U.S. PATENT DOCUMENTS

| | | | |
|---|---|---|---|
| 1,616,349 | 2/1927 | Cagle | 297/465 |
| 2,978,015 | 4/1961 | Cox | 297/485 |
| 3,495,849 | 2/1970 | Cetrone | 297/485 |
| 3,499,681 | 3/1970 | Benitez, Jr. et al. | 297/465 |
| 3,829,122 | 8/1974 | Bastide | 280/748 |
| 3,992,040 | 11/1976 | Gaonnrac | 297/465 |

Primary Examiner—Ross Weaver
Attorney, Agent, or Firm—Richard M. Goldberg

[57] ABSTRACT

An assembly for releasably restraining a person in a seat of a transport vehicle, includes a vertically oriented channel in the seat, having a substantially semi-circular cross-sectional configuration and an open portion along a substantial length thereof; and a device releasably securable on the person and engageable within the channel for releasably restraining the person in the seat, the device including a jacket-like garment to be worn by the person, the garment including buttons or zippers for releasably securing the garment on the person; a vertically oriented rear strap secured to a central back portion of the garment; a plurality of mushroom-shaped protrusions secured to the rear strap and extendable through the open portion of the channel for slidably engaging within the channel to releasably secure the garment to the seat, each protrusion having a substantially hemispherical head and a stem, each head slidably engaging within the channel and each stem extending through the open portion of the channel, each stem having a first end secured to a respective head and a second, opposite end secured to the rear strap; left and right shoulder straps secured to the garment, each shoulder strap having a lower end extending to a front portion of the garment, and an upper end secured to an upper end of the rear strap; and a lap belt secured in the garment, to the lower ends of the left and right shoulder staps and to a lower end of the rear strap.

32 Claims, 4 Drawing Sheets

JACKET WITH SAFETY HARNESS FOR USE WITH TRANSPORT VEHICLE

BACKGROUND OF THE INVENTION

This invention relates generally to safety devices for transport vehicles and, more particularly, is directed to a jacket having a built-in safety harness for releasably restraining a person in a seat of transport vehicle.

The use of seat belts and shoulder straps for releasably restraining a person in the seat of a vehicle are well known, and in fact, are mandated by law for automotive vehicles. A problem, however, with such seat belts and shoulder straps is that they are often not worn by a person because of neglect, uncomfortableness and the like. Such belts are disadvantageous also for the reason that, if there is a sudden impact, the forces applied to the person may result in the belt or strap cutting into the person's body, causing injury.

As a result of these disadvantages, various safety vests or the like have been proposed having safety harnesses connected thereto or built thereinto. An example of one such safety vest can be found in U.S. Pat. No. 3,827,716 in which the vest has lower and upper straps secured thereto, the straps being secured to the vehicle seat. Although such a safety vest is more comfortable to a user and provides better protection than the aforementioned seat belts and shoulder straps, that is, since the person's entire chest and shoulder area are properly supported, the degree of flexibility of movement by the person is limited, particularly in side to side turning movements. See also U.S. Pat. No. 4,226,474. Thus, although these safety vests provide greater security to the user, particularly during high impact forces, they may be relatively uncomfortable during use.

Other safety vests or like devices are disclosed in U.S. Pat. Nos. 4,063,778 and 4,437,628. However, these devices also suffer from the same deficiencies and, in addition, are generally constructed in a more complex manner.

U.S. Pat. Nos. 3,218,103 and 4,143,914 disclose analogous systems which may be relevant to the present invention.

OBJECTS AND SUMMARY OF THE INVENTION

Accordingly, it is an object of the present invention to provide a jacket with a built-in safety harness for use with a transport vehicle.

It is another object of the present invention to provide such a jacket that ensures a high degree of safety for the user, even during high impact forces.

It is still another object of the present invention to provide such a jacket that is comfortable, permitting a relatively wide side to side twisting motion.

It is yet another object of the present invention to provide such a jacket that inflates upon impact to provide further safety for the user.

In accordance with an aspect of the present invention, an assembly for releasably restraining a person in the seat of a transport vehicle, comprises:

a channel in the seat, the channel having an open portion along a substantial length thereof; and a device releasably securable on the person and engageable within the channel for releasably restraining the person in the seat, the device including:

a garment to be worn on the upper body of the person, the garment including garment securing means for releasably securing the garment on the upper body of the person; and a plurality of protrusion means secured to a rear portion of the garment and extendable through the open portion of the channel for slidably engaging within the channel to releasably secure the garment to the seat.

In accordance with another aspect of the present invention, a device is provided for releasably restraining a person in a seat of a transport vehicle, the seat having a channel therein which has an open portion along a substantial length thereof, the device comprising:

a garment to be worn on the upper body of the person, the garment including garment securing means for releasably securing the garment on the upper body of the person; and a plurality of protrusion means secured to a rear portion of the garment and extendable through the open portion of the channel for slidably engaging within the channel to releasably secure the garment to the seat.

In accordance with still another aspect of the present invention, an assembly for releasably restraining a person in a seat of a transport vehicle, comprises:

a vertically oriented channel in the seat, the channel having a substantially semi-circular cross-sectional configuration and having an open portion along a substantial length thereof; and a device releasably securable on the person and engageable within the channel for releasably restraining the person in the seat, the device including:

a jacket-like garment to be worn on the upper body of the person, the garment including garment securing means for releasably securing the garment on the upper body of the person;

a vertically oriented rear strap secured to a central back portion of the garment;

a plurality of protrusion means secured to the rear strap and extendable through the open portion of the channel for slidably engaging within the channel to releasably secure the garment to the seat, each the protrusion means having a substantially hemispherical head and a stem, each the head slidably engaging within the channel and each the stem extending through the open portion of the channel, each the stem having a first end secured to a respective head and a second, opposite end secured to the rear strap;

left and right shoulder straps secured to the garment, each shoulder strap having a lower end extending to a front portion of the garment, and an upper end secured to an upper end of the rear strap; and a lap belt secured in the garment, to the lower ends of the left and right shoulder straps and to a lower end of the rear strap.

The above and other objects, features and advantages of the present invention will become readily apparent from the following detailed description thereof which is to be read in connection with the accompanying drawings.

DETAILED DESCRIPTION OF THE PREFERRED EMBODIMENTS

Figure 1:
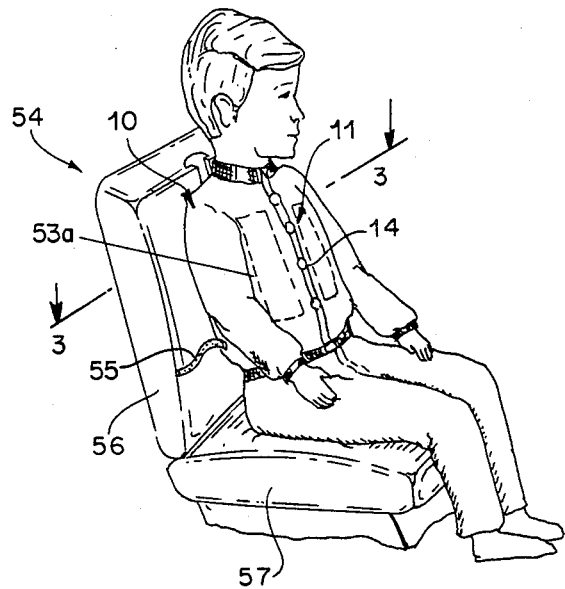
FIG. 1 is a perspective view of a jacket according to the present invention, being used to secure a person to a seat of a transport vehicle.
Figure 4:
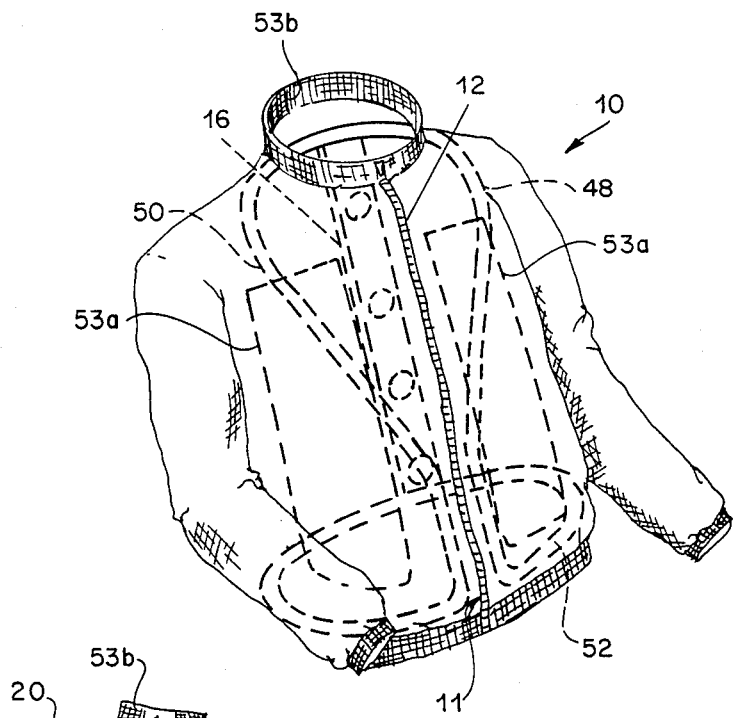
FIG. 4 is a perspective view of the jacket of FIG. 1, partially in phantom.
Figure 5:
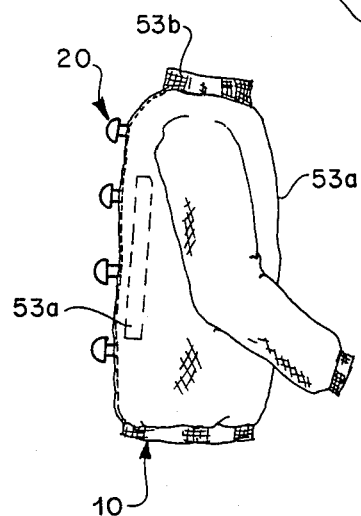
FIG. 5 is a side elevational view of the jacket of FIG. 1.

Referring to the drawings in detail, and initially to FIGS. 4 and 5 thereof, a garment 10 according to one embodiment of the present invention is generally formed as a jacket having sleeves, to be worn by a person in a transport vehicle, such as an automobile. As will be appreciated from the discussion which follows, garment 10 can be formed as a vest, coat or other similar jacket-like garment that is worn on the upper body of the user. As with conventional jacket-like garments, garment 10 includes garment securing means 11 for releasably securing garment 10 on the upper body of the person. For example, in the embodiment of FIG. 4, such garment securing means 11 takes the form of a zipper 12 at the front of garment 10 and in the embodiment of FIG. 1, such garment securing means 11 takes the form of a plurality of buttons 14 also at the front of garment 10, in a conventional manner.

Figure 6:
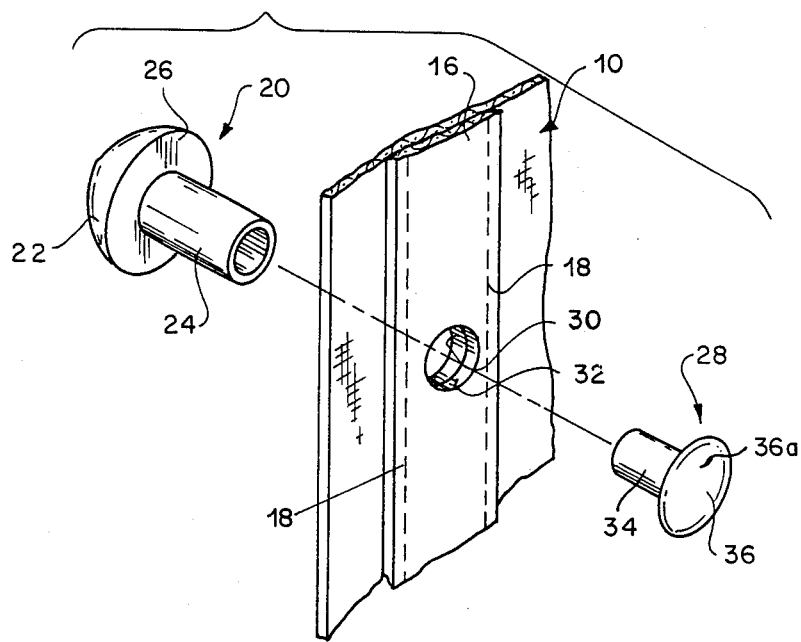
FIG. 6 is a blown apart, perspective view of a mushroom-shaped protrusion and a portion of the jacket of FIG. 1 to which the protrusion is secured, showng one manner of securing the protrusions to the jacket.

In accordance with the present invention, a vertically oriented rear strap 16 is secured centrally to the back of garment 10. For example, rear strap 16 can be sewn into garment 10 by thread 18, as shown in FIG. 6, to secure rear strap 16 to the fabric of garment 10. It will be appreciated, however, that other means of securing rear strap 16 within garment 10 can be used. For example, a pocket (not shown) can be formed in the fabric of garment 10, in which rear strap 16 can be disposed. Further, rear strap 16 can be made of any suitable material, such as that conventionally used for seat belts in automobiles, or alternatively can be made of a structurally more rigid material, such as a plastic or the like.

Figure 3:
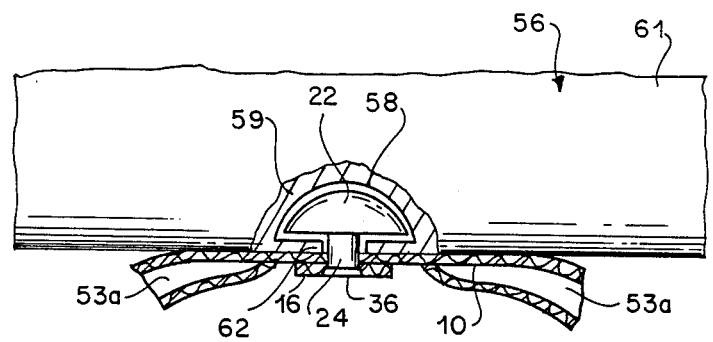
FIG. 3 is a cross-sectional view of a portion of the seat and jacket of FIG. 1, taken along line 3—3 thereof.

In accordance with the present invention, a plurality of mushroom-shaped protrusions 20 are secured to rear strap 16 and garment 10, and extend outwardly from garment 10. Although four such protrusions 20 are shown, any suitable number may be used, as will be explained in greater detail hereinafter. Each mushroom-shaped protrusion 20 includes an enlarged hemispherical head 22 and a stem 24 secured centrally to the planar surface 26 of hemispherical head 22. Mushroom-shaped protrusions 20 can be secured to rear strap 16 and the fabric of garment 10 in any suitable manner that prevents pull-out during high impact forces. For example, as shown in FIGS. 3 and 6, mushroom-shaped protrusions 20 can be secured with rivets 28. In this regard, each stem 24 can be formed hollow such that a rivet 28 is force fit thereinto to secure stem 24 and rivet 28 together in a manner that prevents pull-out.

A plurality of apertures 30 are formed in spaced locations vertically at the back of garment 10 and a plurality of apertures 32 are likewise formed in spaced apart relation in rear strap 16, in alignment with garment apertures 30, with each stem 24 of a respective mushroom-shaped protrusion 20 extending through an aligned pair of apertures 30 and 32.

More particularly, each rivet 28 includes a stem 34 and an enlarged head 36, with stem 34 being adapted to fit within a stem 24 of a mushroom-shaped protrusion 20 in a force fit manner.

Figure 3A:
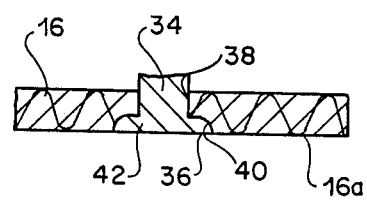
FIG. 3A is a blown-up, cross-sectional view of a portion of the jacket of FIG. 3.

Each aperture 32 in rear strap 16 is formed with a narrow inner opening 38 and a wide outer opening 40, thereby forming a shoulder portion 42 against which enlarged head 36 of rivet 28 lies, as shown in FIG. 3A. In other words, enlarged head 36 of each rivet 28 is recessed such that the outer surface 36a of enlarged head 36 of each rivet 28 lies in the same plane as the exposed inner surface 16a of rear strap 16, so as not to cause discomfort to the user. In addition, shoulder portion 42 provides a surface against which the inner surface of enlarged head 36 of each rivet 28 lies to prevent pull-out of rivet 28 during high impact forces.

Figure 7:
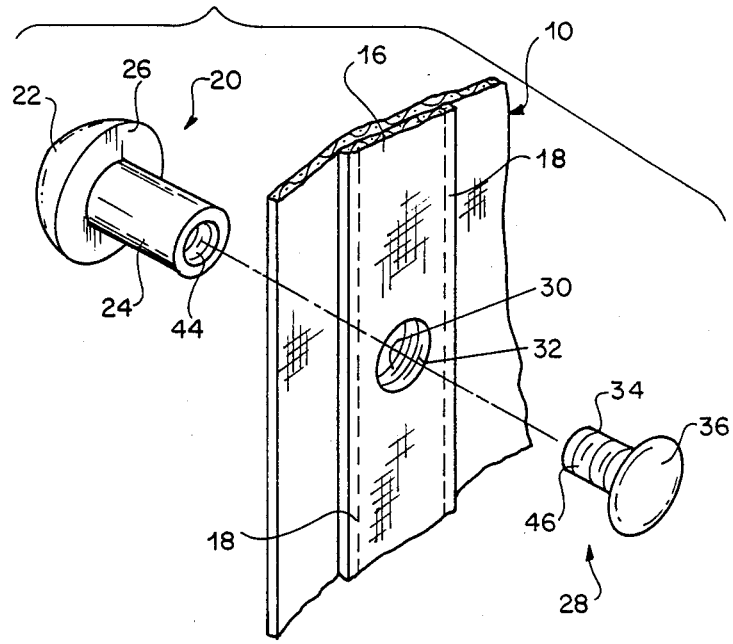
FIG. 7 is a blown apart, perspective view of a mushroom-shaped protrusion and a portion of the jacket of FIG. 1 to which the protrusion is secured, showing another manner of securing the protrusions to the jacket.

Although the present invention has been disclosed with rivet 28 being force fit into stem 24 of a mushroom-shaped protrusion 20, other securing means can be provided. For example, the interior of stem 24 can be screw-threaded, as shown at 44 in FIG. 7, and, in like manner, the exterior surface of stem 34 can likewise be screw-threaded, as at 46, so that stem 34 can be screw-threadedly received within stem 24 of mushroom-shaped protrusion 20, to secure rivet 28 to mushroom-shaped protrusion 20 in a manner which resists high impact forces.

Referring back to FIGS. 4 and 5, in order to provide further safety to the user, left and right shoulder straps 48 and 50 are secured to garment 10. Specifically, each shoulder strap 48 and 50 extends from the upper end of rear strap 16 at the back of garment 10, over a respective shoulder and down to the waist area at the front of garment 10. Shoulder straps 48 and 50 can be secured to garment 10 in any suitable manner, such as stitching or the like. In addition to shoulder straps 48 and 50 being secured to garment 10, the upper ends of shoulder straps 48 and 50 are also secured to the upper end of rear strap 16 by sewing, adhesive or the like. This is an important aspect of the present invention since, unlike the devices of U.S. Pat. Nos. 4,226,474 and 3,827,716, the shoulder straps are not independently secured at opposite sides to the seat, which would normally restrict side-to-side movement of the person. Rather, since shoulder straps 48 and 50 meet at the upper end of rear strap 16, the user is only restrained at the central portion of garment 10, that is, along rear strap 16 by protrusions 20, as will be discussed in greater detail hereinafter, so that side to side twisting movement of the user is not unduly restricted, while at the same time, providing the safety of shoulder straps 48 and 50.

In addition, a lap belt 52 extends around the waist portion of garment 10, secured thereto by stitching or the like. Opposite ends of lap belt 52 are connected to the lower ends of shoulder straps 48 and 50 and, in fact, can be integrally formed therewith, and is also secured to the lower end of rear strap 16 to provide still additional support. Again, since lap belt 52 is secured only at the lower end of rear strap 16, there is a restraint only during high impact forces at the position of rear strap 16 at the center of the back of garment 10, so that side-to-side twisting by the user is not unduly restricted.

Further, garment 10 preferably has air pockets 53a built into the front and rear thereof, the air pockets 53a being connected to a flexible line 55 or the like which does not restrict movement of the user. An air pocket 53b is preferably also formed in the neck portion of garment 10 to protect the head and neck of the wearer during a collision. During a high impact collision, air pockets 53a and 53b are caused to inflate to further protect the user. The inflation of air pockets 53a and 53b is controlled in the same manner as with conventional air bags used in automotive vehicles, and a further discussion of how the air pockets 53a and 53b inflate is not believed necessary to the present invention.

Figure 2:
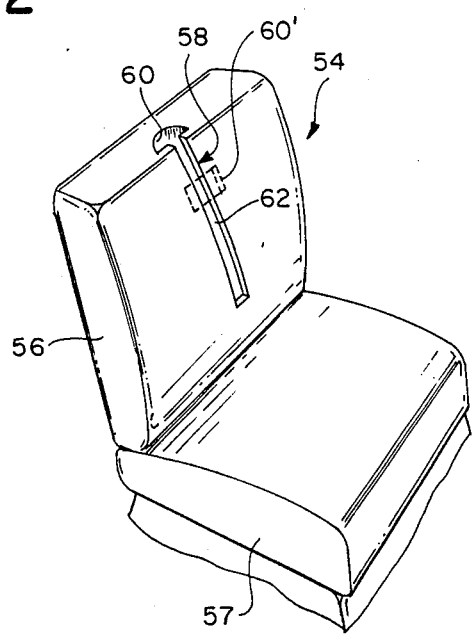
FIG. 2 is a perspective view of a seat having a channel therein for use with the jacket of FIG. 1.

Referring now to FIGS. 2 and 3, garment 10 is intended to be used with a seat 54 of a transport vehicle. Specifically, seat 54 includes a seatback 56 and a seat bottom 57, as is conventional. In accordance with the present invention, a vertically oriented hemispherical channel 58 is formed in seatback 56 and is open at the upper end 60 thereof. Channel 58 is preferably formed within a rigid casing 59, made of any suitable material such as a high density plastic, metal or the like, which can be secured in a rigid manner within seatback 56, while also providing padding 61 therearound for the comfort of the user. In addition, channel 58 is open along a slot 62 at the front of seatback 56, and extending along the entire length thereof from open end 60 to the lower end thereof adjacent seat bottom 57. Slot 62 is relatively narrow compared with channel 58 and is intended to permit passage only of stems 24 of mushroom-shaped protrusions 20.

In operation, mushroom-shaped protrusions 20 and, in particular, enlarged hemispherical heads 22 thereof, are inserted through open upper end 60 of channel 58 and slid down therealong such that stems 24 extend through slot 62. The user then slips into jacket-like garment 10 and secures the same on his upper body by means of zipper 12, buttons 14 or the like. In the case where protrusions 20 are inserted through open upper end 60 before the wearer slips into garment 10, it is preferable to have four protrusions.

Alternatively, the user can put jacket 10 on first and secure the same by zipper 12, buttons 14 or the like, and then insert mushroom-shaped protrusions 20 in channel 58. In such case, there are preferably a lesser amount, such as two, protrusions 20. In order to aid the wearer to insert protrusions 20 into channel 58, an enlarged opening 60' can be formed along the length of channel 58, rather than at the upper end 60 thereof, as shown in dashed lines in FIG. 2, through which protrusions 20 can be inserted into channel 58.

Because the user is secured only along the vertical line at the center of the back of garment 10, as defined by rear strap 16, side-to-side twisting movement by the user is not substantially hindered. However, garment 10 provides substantial restraint, even under high impact forces by means of protrusions 20 within channel 58. Further support is provided by shoulder straps 48 and 50 and lap belt 52.

Figure 8:
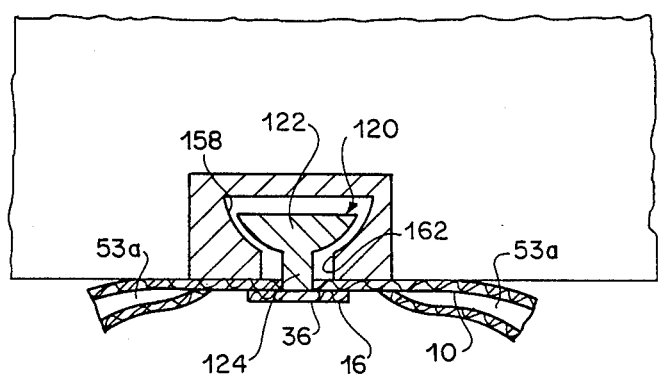
FIG. 8 is a cross-sectional view of a portion of the seat and jacket in accordance with another embodiment of the present invention.

Although protrusions 20 have been disclosed as being mushroom-shaped, an alternative embodiment is shown in FIG. 8 in which like elements are represented by the same numerals, augmented by 100, and a detailed description of such like elements is not repeated herein for the sake of brevity. As shown, the enlarged hemispherical head 122 of mushroom-shaped protrusions 120 are inverted 180 degrees from the embodiment of FIGS. 3 and 6, that is, with stem 124 being connected to the hemispherical surface of head 122. In such manner, channel 158 is also inverted 180 degrees so that the hemispherical portion thereof faces the user. In addition, slot 162 is preferably made wider than that in the embodiment of FIG. 3. This permits greater side-to-side twisting movement by the user as a result of a swiveling motion by enlarged hemispherical head 122 in channel 158, while maintaining at least the same surface area of contact against which the hemispherical head 122 abuts, thereby providing the same or greater strength in the system.

Having described specific preferred embodiments of the invention with reference to the accompanying drawings, it will be appreciated that the present invention is not limited to those precise embodiments, and that various changes and modifications can be effected therein by one of ordinary skill in the art without departing from the spirit or scope of the invention as defined in the appended claims.

What is claimed is:

1. An assembly for releasably restraining a person in the seat of a transport vehicle, said seat including a seat back and a seat bottom, said seat back having a front surface against which the person rests and an opposite rear surface, said seat back having a width defined between said front surface and said rear surface thereof, said assembly comprising:
   a channel extending vertically in said seat back between said front and rear surfaces of said seat, said channel having a width less than that of said seat back and an open portion along a substantial length thereof which is open at said front surface of said seat back; and
   a device releasably securable on the person and engageable within said channel for releasably restraining the person in the seat, said device including:
      a garment to be worn on the upper body of the person, said garment including garment securing means for releasably securing said garment on the upper body of the person; and
      a plurality of separate and vertically spaced protrusion means secured to a rear portion of the garment and extendable through said open portion of the channel for slidably engaging within said channel to releasably secure said garment to said seat.

2. An assembly according to claim 1; wherein said garment securing means includes a plurality of buttons secured to a front portion of said garment.

3. An assembly according to claim 1; wherein said garment securing means includes a zipper secured to a front portion of said garment.

4. An assembly according to claim 1; wherein said plurality of protrusion means are secured along a substantially vertical center section at a back portion of the garment.

5. An assembly according to claim 4; further including a vertically oriented rear strap secured to said back portion of said garment, each said protrusion means being secured to the rear strap.

6. An assembly according to claim 5; wherein said rear strap includes a plurality of vertically spaced apertures and said garment includes a plurality of vertically spaced apertures in alignment with the apertures in said rear strap; and each said protrusion means extends through respective aligned apertures of said rear strap and said garment; and said assembly further includes a plurality of protrusion securing means for securing said protrusion means in said apertures of said rear strap and said garment.

7. An assembly according to claim 6; wherein
each said protrusion means has an enlarged head and a stem extending therefrom, each said stem extending through a respective pair of aligned apertures in said garment and said rear strap, with the respective enlarged head positioned on one side of said rear strap; and
each said protrusion securing means includes an enlarged head on an opposite side of said rear strap, and a securing stem extending therefrom, said securing stem securable with a stem of a respective protrusion means so as to secure said protrusion means to said garment.

8. An assembly according to claim 7; wherein each said securing stem is press fit with a stem of a respective protrusion means.

9. An assembly according to claim 7; wherein each said securing stem is screw-threadedly connected with a stem of a respective protrusion means.

10. An assembly according to claim 7; wherein each said aperture in said rear strap has a narrow opening and a wider opening, with a shoulder formed therebetween against which the enlarged head of a protrusion securing means rests so as to recess said enlarged head to avoid discomfort to the person.

11. An assembly according to claim 5; further including left and right shoulder straps secured to said garment, each shoulder strap having a lower end extending to a front portion of said garment, and an upper end secured to an upper end of said rear strap.

12. An assembly according to claim 11; further including a lap belt secured in said garment, to the lower ends of said left and right shoulder straps and to a lower end of said rear strap.

13. An assembly according to claim 1; wherein each said protrusion means has a substantially hemispherical head and a stem secured thereto, each said head slidably engaging within said channel and each said stem extending through the open portion of said channel, with each said stem having a free end secured to said garment.

14. An assembly according to claim 13; wherein said channel has a substantially semi-circular cross-sectional configuration for receiving said hemispherical head of each protrusion means.

15. An assembly according to claim 14; wherein the hemispherical head of each said protrusion means includes a hemispherical surface and a flat surface; and the stem of each said protrusion means is secured to the flat surface of the respective hemispherical head.

16. An assembly according to claim 14; wherein the hemispherical head of each said protrusion means includes a hemispherical surface and a flat surface; and the stem of each said protrusion means is secured to the hemispherical surface of the respective hemispherical head.

17. A device for releasably restraining a person in the seat of a transport vehicle, said seat including a seat back and a seat bottom, said seat back having a front surface against which the person rests and an opposite rear surface, said seat back having a width defined between said front surface and said rear surface thereof, the seat having a channel therein extending vertically between said front and rear surfaces of said seat, said channel having a width less than that of said seat back and an open portion along a substantial length thereof which is open at said front surface of said seat back, the device comprising:
 a garment to be worn on the upper body of the person, said garment including garment securing means for releasably securing said garment on the upper body of the person; and
 a plurality of separate and vertically spaced protrusion means secured to a rear portion of the garment and extendable through said open portion of the channel for slidably engaging within said channel to releasably secure said garment to said seat.

18. An assembly according to claim 17; wherein said garment securing means includes a plurality of buttons secured to a front portion of said garment.

19. An assembly according to claim 17; wherein said garment securing means includes a zipper secured to a front portion of said garment.

20. An assembly according to claim 17; wherein said plurality of protrusion means are secured along a substantially vertical center section at a back portion of the garment.

21. An assembly according to claim 20; further including a vertically oriented rear strap secured to said back portion of said garment, each said protrusion means being secured to the rear strap.

22. An assembly according to claim 21; wherein said rear strap includes a plurality of vertically spaced apertures and said garment includes a plurality of vertically spaced apertures in alignment with the apertures in said rear strap; and each said protrusion means extends through respective aligned apertures of said rear strap and said garment; and said assembly further includes a plurality of protrusion securing means for securing said protrusion means in said apertures of said rear strap and said garment.

23. An assembly according to claim 22; wherein
each said protrusion means has an enlarged head and a stem extending therefrom, each said stem extending through a respective pair of aligned apertures in said garment and said rear strap with the respective enlarged head positioned on one side of said rear strap; and
each said protrusion securing means includes an enlarged head on an opposite side of said rear strap, and a securing stem extending therefrom, said securing stem securable with a stem of a respective protrusion means so as to secure said protrusion means to said garment.

24. An assembly according to claim 23; wherein each said securing stem is press fit with a stem of a respective protrusion means.

25. An assembly according to claim 23; wherein each said securing stem is screw-threadedly connected with a stem of a respective protrusion means.

26. An assembly according to claim 23; wherein each said aperture in said rear strap has a narrow opening and a wider opening, with a shoulder formed therebetween against which the enlarged head of a protrusion securing means rests so as to recess said enlarged head to avoid discomfort to the person.

27. An assembly according to claim 21; further including left and right shoulder straps secured to said garment, each shoulder strap having a lower end extending to a front portion of said garment, and an upper end secured to an upper end of said rear strap.

28. An assembly according to claim 27; further including a lap belt secured in said garment, to the lower ends of said left and right shoulder straps and to a lower end of said rear strap.

29. An assembly according to claim 17; wherein each said protrusion means has a substantially hemispherical head and a stem secured thereto, each said head slidably engaging within said channel and each said stem extending through the open portion of said channel, with each said stem having a free end secured to said garment.

30. An assembly according to claim 29; wherein the hemispherical head of each said protrusion means includes a hemispherical surface and a flat surface; and the stem of each said protrusion means is secured to the flat surface of the respective hemispherical head.

31. An assembly according to claim 29; wherein the hemispherical head of each said protrusion means includes a hemispherical surface and a flat surface; and the stem of each said protrusion means is secured to the hemispherical surface of the respective hemispherical head.

32. An assembly for releasably restraining a person in the seat of a transport vehicle, said seat including a seat back and a seat bottom, said seat back having a front surface against which the person rests and an opposite rear surface, said seat back having a width defined between said front surface and said rear surface thereof, said assembly comprising:

a vertically oriented channel in said seat back between said front and rear surfaces of said seat, said channel having a width less than that of said seat back and, a substantially semicircular cross-sectional configuration an open portion along a substantial length thereof which is open at said front surface of said seat back; and a device releasably securable on the person and engageable within said channel for releasably restraining the person in the seat, said device including:

a jacket-like garment to be worn on the upper body of the person, said garment including garment securing means for releasably securing said garment on the upper body of the person;

a vertically oriented rear strap secured to a central back portion of the garment;

a plurality of separate and vertically spaced protrusion means secured to the rear strap and extendable through said open portion of the channel for slidably engaging within said channel to releasably secure said garment to said seat, each said protrusion means having a substantially hemispherical head an a stem, each said head slidably engaging within said channel and each said stem extending through the open portion of said channel, each said stem having a first end secured to a respective head and a second, opposite end secured to said rear strap;

left and right shoulder straps secured to said garment, each shoulder strap having a lower end extending to a front portion of said garment, and an upper end secured to an upper end of said rear strap; and a lap belt secured in said garment, to the lower ends of said left and right shoulder straps and to a lower end of said rear strap.

* * * * *